(12) United States Patent
Ling et al.

(10) Patent No.: US 12,194,590 B2
(45) Date of Patent: Jan. 14, 2025

(54) LAPPING DEVICE FOR GEAR HELIX ARTIFACT WITH EQUAL COMMON NORMAL BY ROLLING METHOD

(71) Applicant: DALIAN UNIVERSITY OF TECHNOLOGY, Liaoning (CN)

(72) Inventors: Siying Ling, Liaoning (CN); Ming Ling, Liaoning (CN); Honglin Ren, Liaoning (CN); Xiaoyan Li, Liaoning (CN); Liding Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 426 days.

(21) Appl. No.: 17/780,745

(22) PCT Filed: Jun. 30, 2021

(86) PCT No.: PCT/CN2021/103433
§ 371 (c)(1),
(2) Date: May 27, 2022

(87) PCT Pub. No.: WO2023/272560
PCT Pub. Date: Jan. 5, 2023

(65) Prior Publication Data
US 2023/0182260 A1    Jun. 15, 2023

(51) Int. Cl.
*B24B 37/02*    (2012.01)
*B23F 1/02*    (2006.01)
*B24B 37/27*    (2012.01)

(52) U.S. Cl.
CPC ............... *B24B 37/02* (2013.01); *B23F 1/02* (2013.01); *B24B 37/27* (2013.01)

(58) Field of Classification Search
CPC ..... B24B 37/02; B24B 37/27; B24B 27/0092; B24B 41/06; B24B 41/065; B24B 3/24; B24B 3/33; B23F 1/02
(Continued)

(56) References Cited

U.S. PATENT DOCUMENTS 4,955,163 A * 9/1990 Sommer ............... B23F 19/002
451/21
2004/0117998 A1    6/2004 Och

FOREIGN PATENT DOCUMENTS

CN    102284750 A    12/2011
CN    105716554 A    6/2016
(Continued)

*Primary Examiner* — Joel D Crandall
*Assistant Examiner* — Caleb Andrew Holizna
(74) *Attorney, Agent, or Firm* — MUNCY, GEISSLER, OLDS & LOWE, P.C.

(57) ABSTRACT

A lapping device for gear helix artifact with equal common normal by rolling method, use the rotary table to accurately control the angle between the lapping surface of whetstone and the axis of the base-circle cylinder to control the helix angle of base-circle about the involute helicoid. Use the whetstone driven component to drive the whetstone to make a high-precision linear motion in the vertical direction to adjust the position of the lapping surface of whetstone. The distance between the two lapping surface of whetstone is precisely adjusted by the gauge block to control the processing length of the three tooth common normal of the gear helix artifact. The invention provides a lapping device for gear helix artifact with equal common normal by rolling method, it conforms to the generation principle of the involute helicoid, and there is no machining principle error.

5 Claims, 10 Drawing Sheets

(58) Field of Classification Search
USPC .......................................................... 451/11
See application file for complete search history.

(56) References Cited

FOREIGN PATENT DOCUMENTS

| | | |
|---|---|---|
| CN | 106482693 A | 3/2017 |
| CN | 109186511 A | 1/2019 |
| CN | 111060061 A | 4/2020 |
| CN | 111156942 A | 5/2020 |
| JP | 2006035400 A | 2/2006 |
| JP | 2006250625 A | 9/2006 |

\* cited by examiner

LAPPING DEVICE FOR GEAR HELIX ARTIFACT WITH EQUAL COMMON NORMAL BY ROLLING METHOD

FIELD OF THE INVENTION

The present invention relates to a lapping device for gear helix artifact with equal common normal by rolling method, which belongs to the field of the precision gear machining and measurement technique.

BACKGROUND

Regardless of the variety of gears, there are three basic parameters that internationally recognized as the most representative gear quality, which are the profile deviation, the helix deviation and the pitch deviation. The gear artifacts corresponding to the three parameters are the gear involute artifact, the gear helix artifact and the gear pitch artifact, which are used to transfer measurement value of gear parameters, correct the instrument indication and determinate the indication errors of the instrument and so on. As the value-transmission reference of the gear helical parameters, the manufacturing technology of the high-level gear helix artifact is still blank at home and aboard. The gear helix artifacts currently circulating on the market no longer meet the current requirements of the currently valid Chinese national standard of the gear helix artifact.

Base on the Chinese national standard GB/T 6468-2010 of the gear helix artifact, the accuracy class of the gear helix artifact can be divided into two classes, that is Class1 and Class2. The Class-1 gear helix artifact should have at least an involute cylindrical surface and at least a pair of the involute helicoidal surfaces of the left and right tooth flank with the same helix angle, in addition the tooth width of the gear helix artifact is greater than 90 mm and the involute length used to determinate base circle parameters is not less than 15 mm. And the Class-2 gear helix artifact should have at least an involute cylindrical surface and at least a pair of the involute helicoidal surfaces of the left and right tooth flank with the same helix angle, in addition the tooth width of the gear helix artifact is greater than 60 mm and the involute length used to determinate base circle parameters is not less than 10 mm. Since it is very difficult to machine and measure the Class-1 gear helix artifact for the close tolerances, the currently published patents do not involve the machining method and device of the gear helix artifact. Therefore, the development of a new type of gear helix artifact and its machining device has become a top priority. The patent (ZL 201811078252.0) discloses a reference-level gear helix artifact, which only mentions the design structure and style of the gear helix artifact and does not involve the gear helix artifact machining device.

The gear helix artifact with equal common normal is one kind of the new gear artifacts which is of a straight tooth, a left-hand tooth and a right-hand tooth on the middle cylindrical surface of the gear helix artifact. The left-hand tooth and the right-hand tooth arranged symmetrically to the straight tooth, and each tooth of the new gear helix artifact contains two opposite side tooth flanks, of which the two opposite side tooth flanks of the straight tooth are involute cylindrical surface, the two opposite sides of the left-handed tooth and the right-handed tooth are involute helicoid, and the helix angles of the left-hand tooth and right-hand tooth are equal. The three teeth of the gear helix artifact with equal common normal simultaneously have the same transverse pressure angle, basic circle and reference circle. The design of the new gear helix artifact with equal common normal meets the basic requirements of Class-1 accuracy in the Chinese national standard GB/T 6468-2010 of the gear helix artifact, however, the machining method and machining device of the gear helix artifact with equal common normal are still blank at home and abroad.

SUMMARY

In order to manufacture high-precision gear helix artifact, based on the principle that as a plane rolling around the base-circle cylinder, the trajectory swept with a straight line at a certain acute angle with the axis of the base cylinder on the plane is an involute helicoid, the invention provides a lapping device for gear helix artifact with equal common normal by rolling method.

The specific technical solution is as follows: a lapping device for gear helix artifact with equal common normal by rolling method, comprises the whetstone component, the baffle component, the multi-ball bearing plate component, the whetstone driven component, the roller component, the foundation component, the position baffle for the base-circle plate, the rail component, the spring clamp with guide pillar and the rotary table component, wherein the rail component is fixed on the foundation component, one side of the rail component and the foundation component is positioned by the position baffle for the base-circle plate and the roller component is located on the rail component. In the groove of the foundation component, between the two guide rails, the whetstone component is located above the rotary table component and is clamped with the spring clamp with guide pillar. In the same working plane between the whetstone component and the rotary table component, the whetstone driven component, the multi-ball bearing plate component and the baffle component are arranged from inside to outside.

The whetstone component comprises the whetstone A, the whetstone B and the whetstone connecter. The working surface of whet stone has the sub-micron level of surface accuracy by ultra-precision lapping. The whetstone A and the whetstone B are provided with the fixing hole in the whet stone, the whetstone connecter is provided with the screw holes for the whetstone adjustment, the counter bore and ball slot. The ball slot can provide positioning support for the clamp when using the matching clamps. The whetstone A and the whetstone B are installed on the whetstone connecter with the connecting screw, and the whetstone connecter is pressed against the wedge A through the counter bore on the whetstone connecter. The fixing hole in the whet stone is larger than the screw holes for the whetstone adjustment, so as to realize the slight adjustment of the positions of the whetstone A and the whetstone B. The whetstone A and the whetstone B are arranged symmetrically, and the intersection lines of the lapping surface and the guide rail plane are parallel, and the distance between the two whet stones is the design length of the common normal of the three teeth of the gear helix artifact with equal common normal.

The multi-ball bearing plate component comprises multi-ball bearing plate A, multi-ball bearing plate B, multi-ball bearing plate C and multi-ball bearing plate D to form four slides of a rectangular space. The whetstone driven component comprises the wedge A, the wedge B, the adapter for rotary table, the T-slot snap ring and the clamp for micrometer and the micrometer. The wedge A is provided with screw holes for the whetstone connecter for installing the whetstone connecter. The rail surface of the wedge A and multi-ball bearing plate D after ultra-precision lapping can be used as vertical rail surfaces. The rail surfaces of the wedge A and the wedge B respectively in contact with multi-ball bearing plate A and multi-ball bearing plate C after ultra-precision lapping can be used as horizontal rail surfaces. The bottom surface of the wedge B, as the rail surface for bottom plate, is attached the PTFE rail soft belt, which can reach the target accuracy by scraping. There is a T-slot on the wedge B, which cooperates with the T-slot snap ring to realize the forward and backward movement of the wedge B. There is a mounting hole in the clamp for micrometer to install the micrometer, which is tighten on the adapter for rotary table with the connecting screw. The micrometer cooperates with the T-slot snap ring to realize the horizontal movement of the wedge B, then push the wedge A to make a high-precision linear movement in the vertical direction to change the lapping work area of the whetstone.

The baffle component comprises L-board A, L-board B, L-board C, L-board D, plate A, plate B and the adapter for rotary table. The L-board A, L-board B, L-board C, and L-board D are fixed on the adapter for rotary table as the four sides of the rectangular space to enclose the multi-ball bearing plate component. The L-board C and L-board D that are in contact with the multi-ball bearing plate component which are used as fixed rails, and the contact surface is a vertical rail surface by ultra-precise lapping. The plate A and plate B that are in contact with the multi-ball bearing plate component, and the plate A and plate B are used as adjustable rails, and the contact surface is a vertical rail surface that has been ultra-precisely lapping. The L-board A is provided with the screw holes for locating the plate and the set-screw holes for the plate A, the limiting screw is installed in the screw holes for locating the plate to realize the limit of plate A and plate B. The plate A, the multi-ball bearing plate A, the wedge A, the wedge B and the multi-ball bearing plate C are pressed on the vertical rail surface of the L-board C with installing the setscrew in the set-screw holes for the plate A. The L-board B is provided with the set-screw holes for the plate B, by installing the setscrew in the set-screw holes for the plate B, the plate B, the multi-ball in bearing plate B, the wedge A, and the multi-ball bearing plate D are pressed on the vertical rail surface of the L-board D. And the L-board C is provided with the screw holes for locating the plate, the limiting screw is installed in the screw holes for locating the plate to realize the limit of plate B.

The rotary table is used to drive whetstone A and whetstone B to rotate, by adjusting the angle between the working surface of whetstone and the axis of the base-circle cylinder to realize the grinding of the artifact of the base circle helix angle at any angle. At the same time, the indexing accuracy of the left-handed and right-handed helix angle with the same helix angle of base circle can be guaranteed.

The spring clamp with guide pillar is used to realize the clamping of the device after indexing, increase the rigidity of the system and prevent the relative movement between the wedges from causing the whet stone to shift in the vertical direction. At the same time, the elastic force of the spring clamp with guide pillar can help the wedge A falling down due to the insufficient weight during the falling process.

The whetstone A and the whetstone B are made of silicon carbide, boron carbide or cubic boron nitride by sintering, which is of lower thermal expansion coefficient and higher hardness. The target plane accuracy and surface roughness are obtained by lapping with each other.

By ensuring the machining and installation accuracy of the baffle component and the whetstone driven component, the whetstone can only make the high-precision linear motion in the vertical direction and limit the degrees of freedom in other directions without rotating motion. By adjusting the angle between the working surface of the whetstone A, whetstone Band the axis of the base-circle cylinder with the rotary table, the helix angle of the left-handed and right-handed involute helicoids of the gear helix artifact can be consistent. When machining the gear helix artifact, the device is clamped with the spring clamp with guide pillar to increase the stiffness and reliability of the device. Since the contact between the working surface of whetstone and the involute helicoid is line-contact, adjusting the micrometer after the gear helix artifact is processed for a period of time can adjust the whetstone to move a small distance in the vertical direction, that is, by adjusting the position of the whetstone lapping work area, the excessive use of whetstone in the same position can be avoided, which result in the accuracy reduction of flatness and distance of the whetstone's working surface.

The beneficial effect of the invention are as follows: the present invention provides a lapping device for gear helix artifact with equal common normal by rolling method, use the rotary table to accurately control the angle between the working surface of whetstone and the axis of the base-circle cylinder to control the helix angle of base-circle about the involute helicoid. Use the whetstone driven component to drive the whetstone to make a high-precision linear motion in the vertical direction to adjust the position of the working surface of whetstone. The distance between the two lapping surfaces of whetstone is precisely adjusted with the gauge block to control the machining length of the three tooth common normal of the gear helix artifact. The invention provides a lapping device for gear helix artifact with equal common normal by rolling method, it conforms to the generation principle of the involute helicoid, and there is no machining principle error. The structure of the equal common normal makes the lapping normal forces experienced during the machining of the gear helix artifact cancel each other, which is beneficial to improve the lapping accuracy of the gear helix artifact, and can realize the machining of the gear helix artifact with the Class-1 accuracy.

Figure 1:
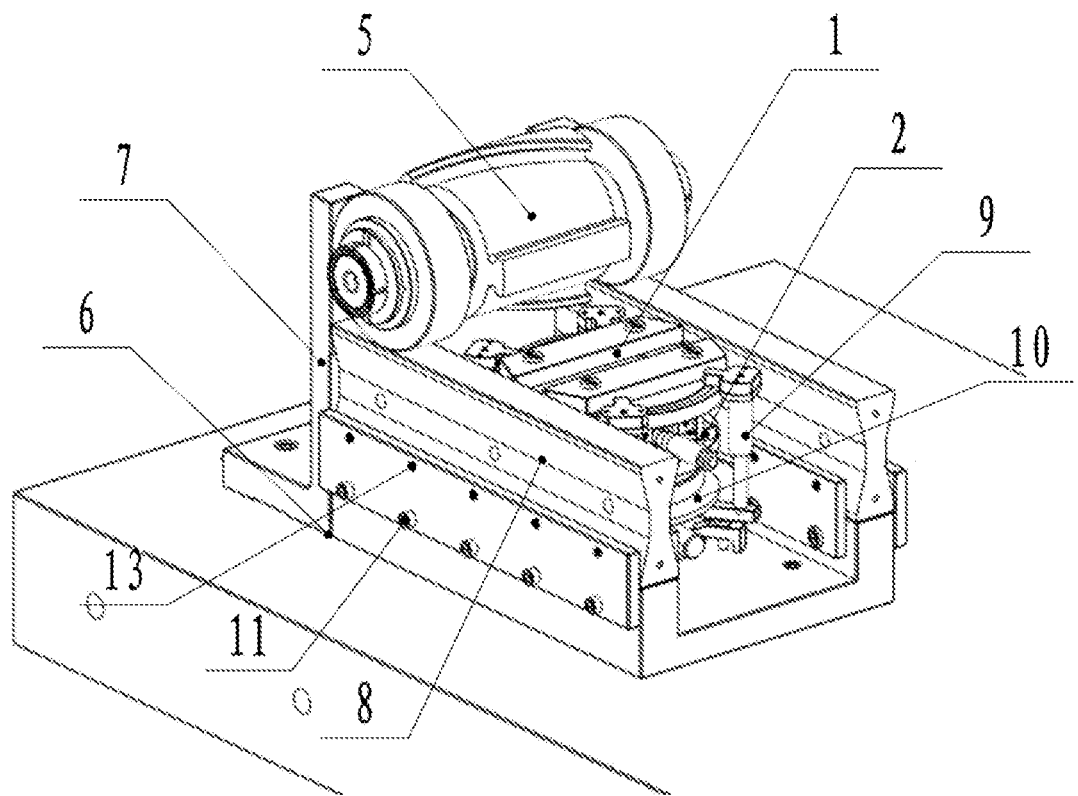
FIG. 1 illustrates the lapping device for gear helix artifact with equal common normal.
Figure 2:
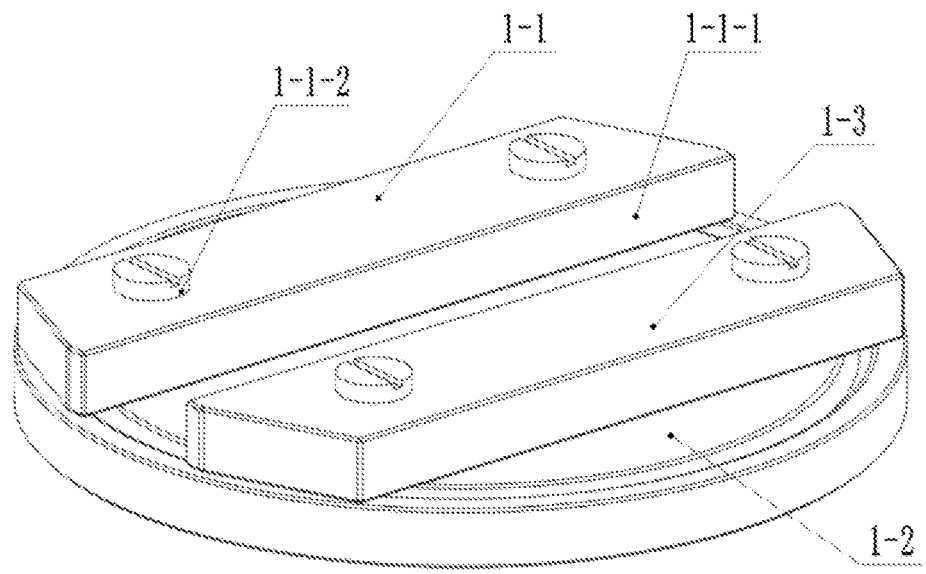
FIG. 2 illustrates the whetstone component.
Figure 3:
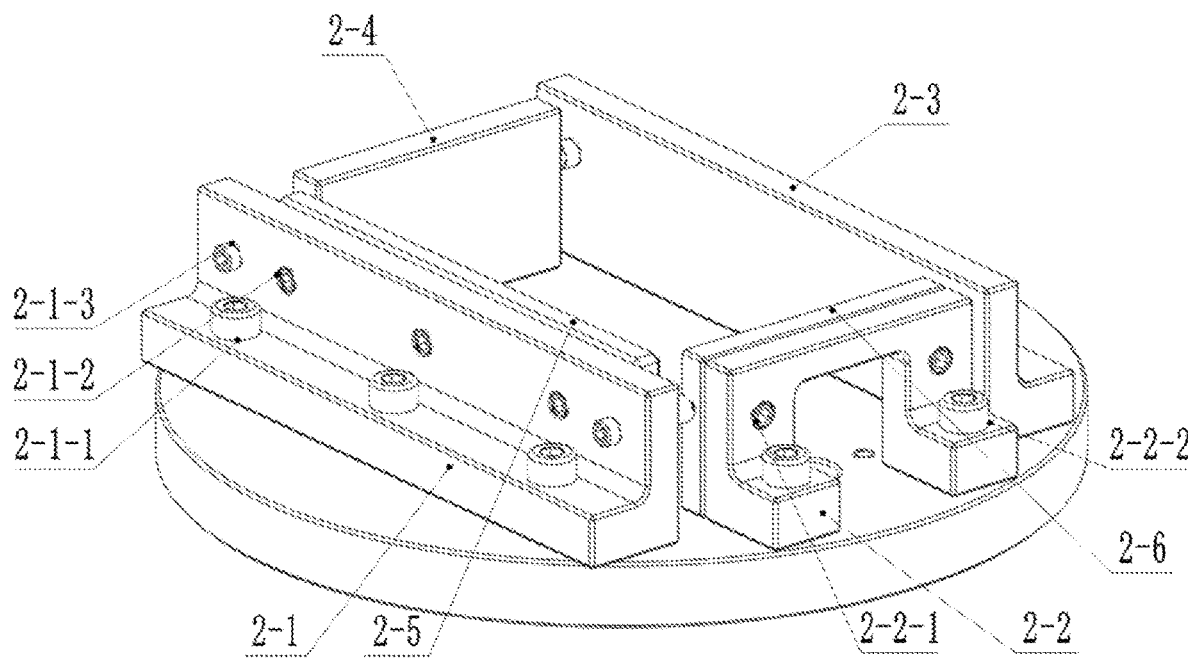
FIG. 3 illustrates the baffle component.
Figure 4:
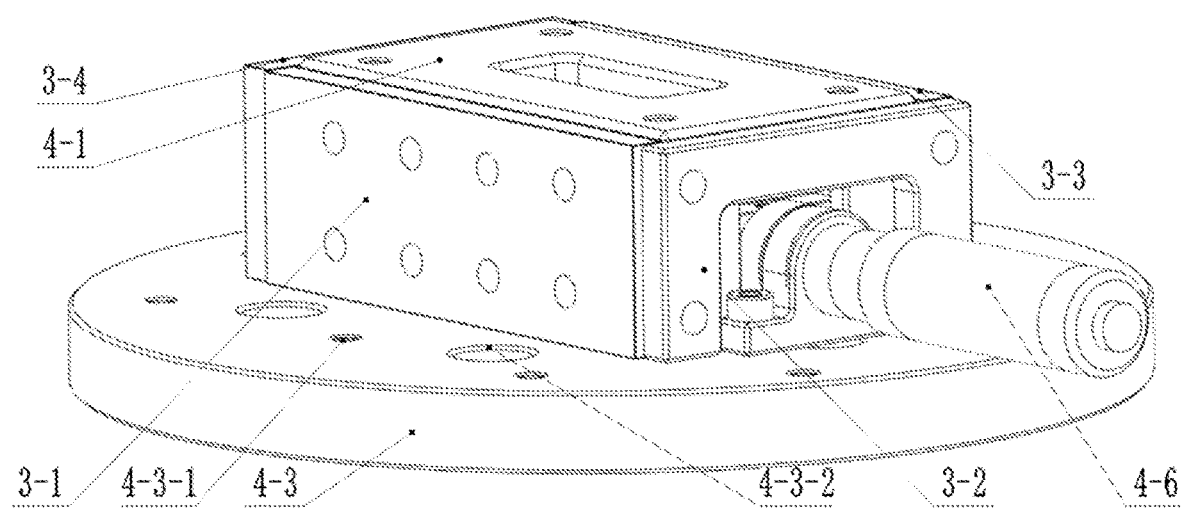
FIG. 4 illustrates the multi-ball bearing plate component and the whetstone driven component.
Figure 5:
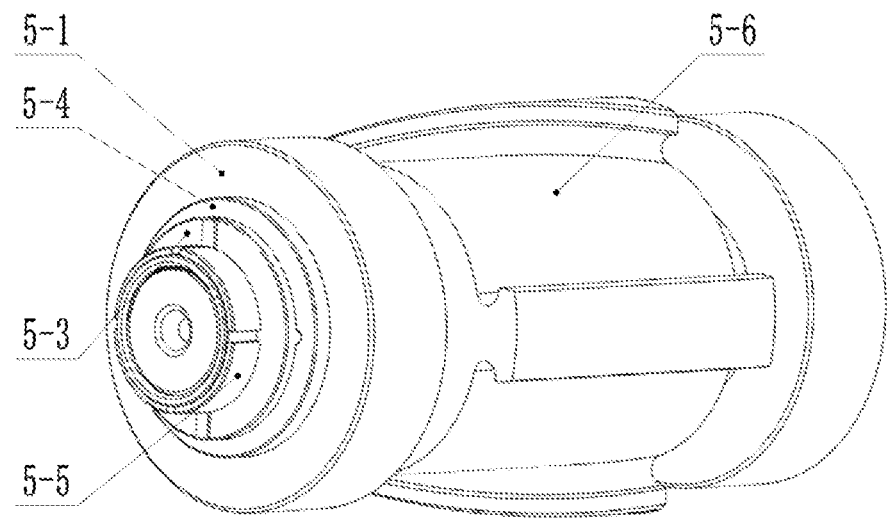
FIG. 5 illustrates the roller component.
Figure 6:
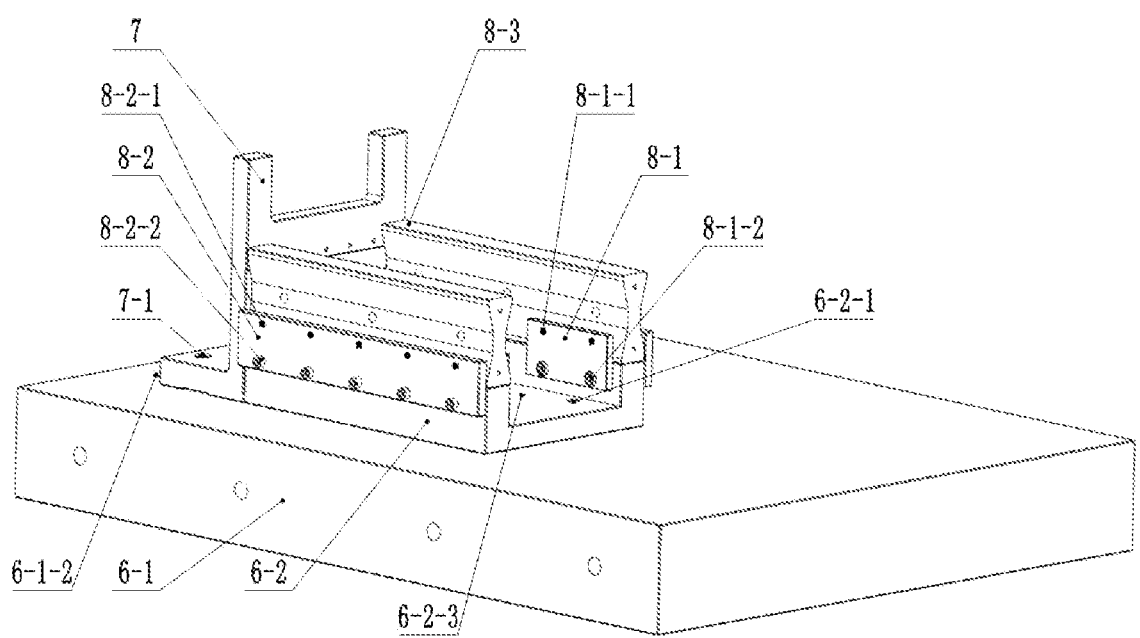
FIG. 6 illustrates the foundation component, the rail component and the position baffle for the base-circle plate.
Figure 7:
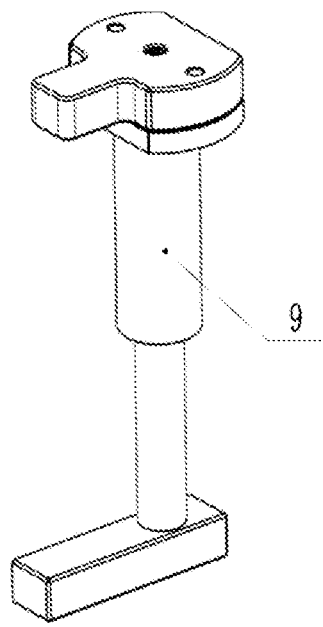
FIG. 7 illustrates the spring clamp with guide pillar.
Figure 8:
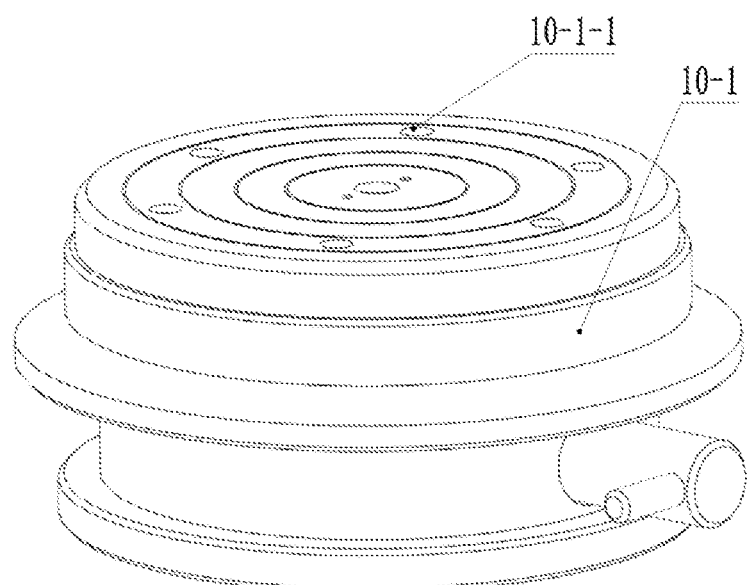
FIG. 8 illustrates the rotary table.
Figure 9:
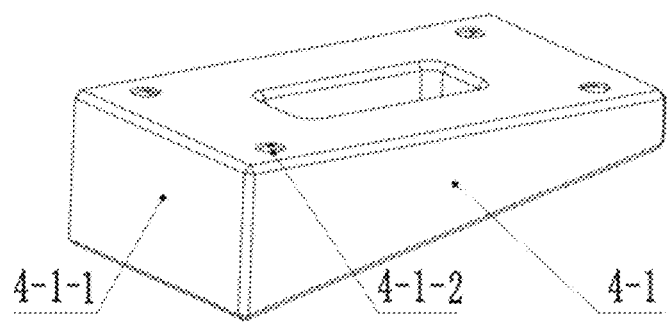
FIG. 9 illustrates the wedge A.
Figure 10:
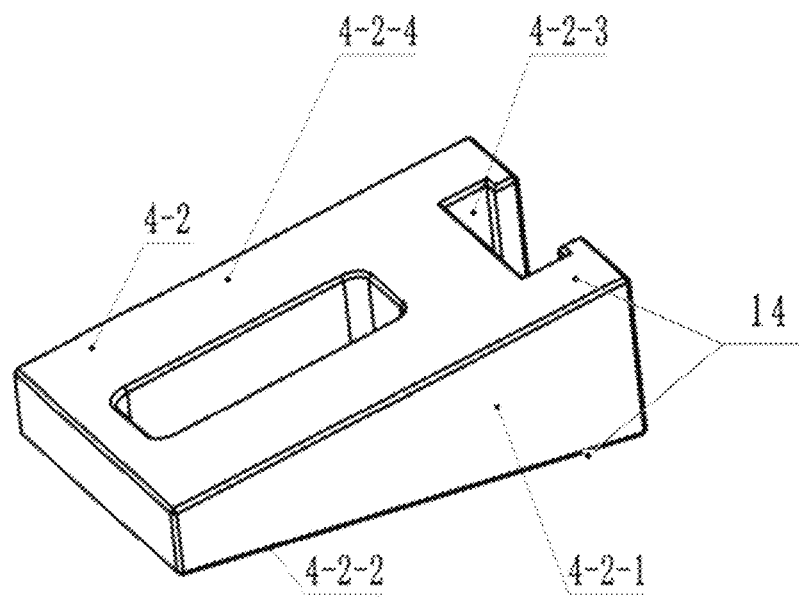
FIG. 10 illustrates the wedge B.
Figure 11:
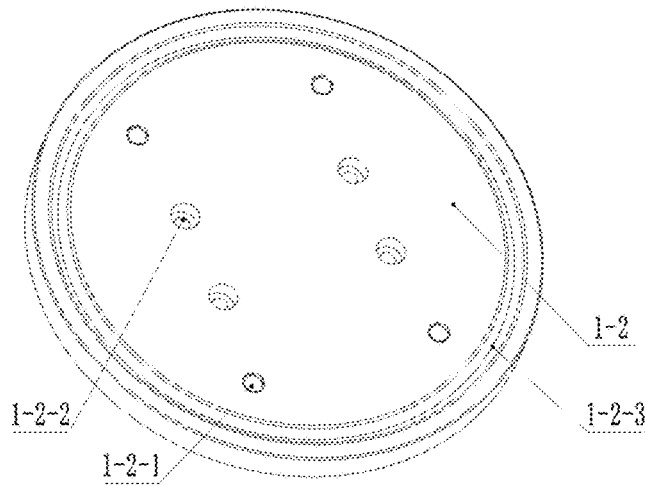
FIG. 11 illustrates the whetstone connecter.
Figure 12:
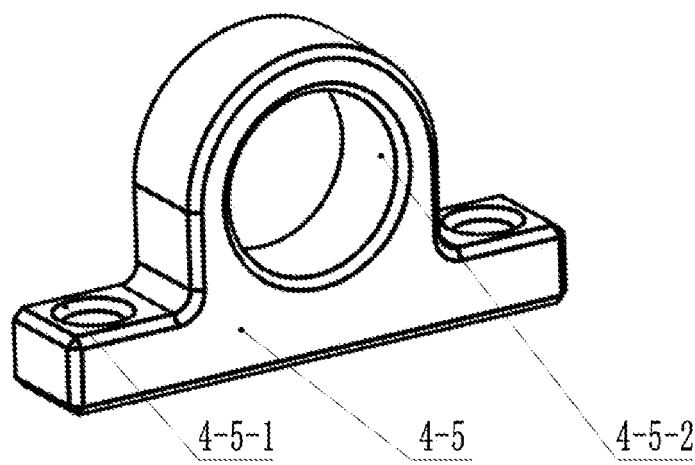
FIG. 12 illustrates the clamp for micrometer.
Figure 13:
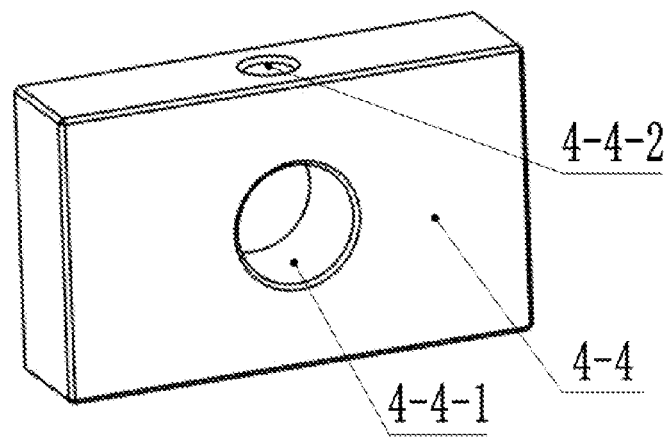
FIG. 13 illustrates the T-slot snap ring.
Figure 14:
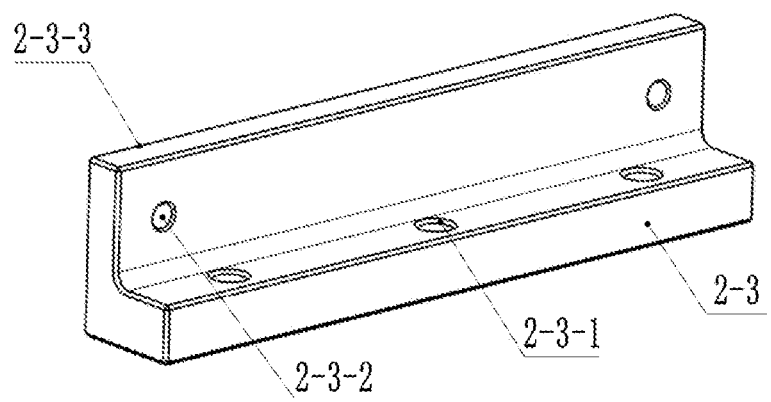
FIG. 14 illustrates the L-board C.
Figure 15:
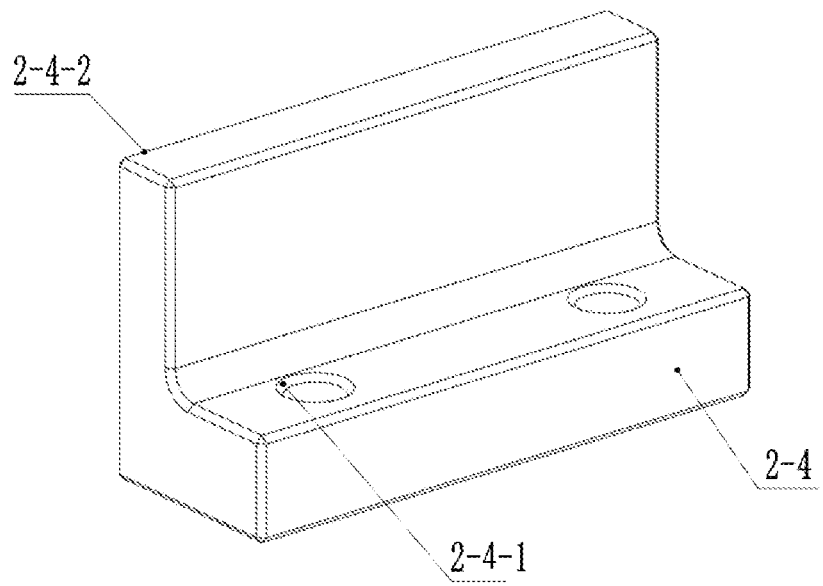
FIG. 15 illustrates the L-board D.
Figure 16:
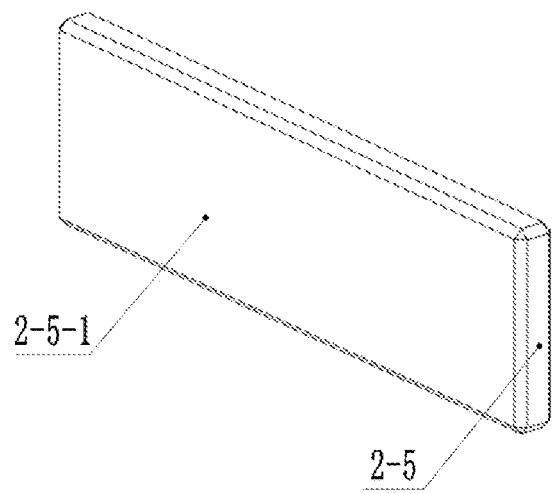
FIG. 16 illustrates the plate A.
Figure 17:
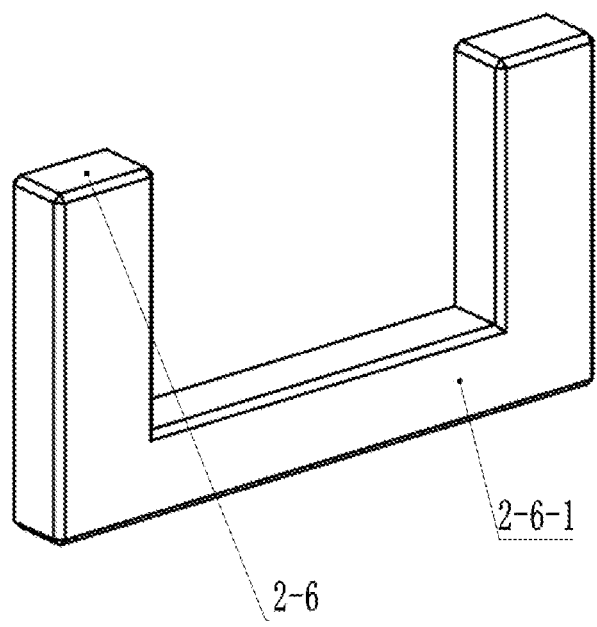
FIG. 17 illustrates the plate B.
Figure 18:
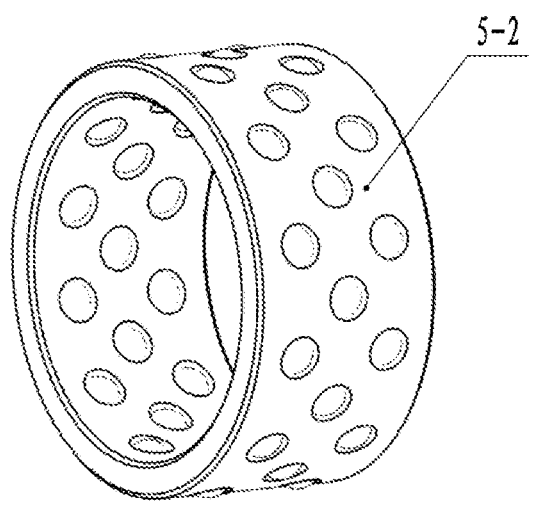
FIG. 18 illustrates the multi-ball bearing.
Figure 19:
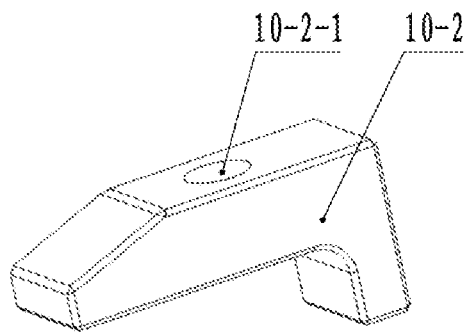
FIG. 19 illustrates the clamp for rotary table.
Figure 20:
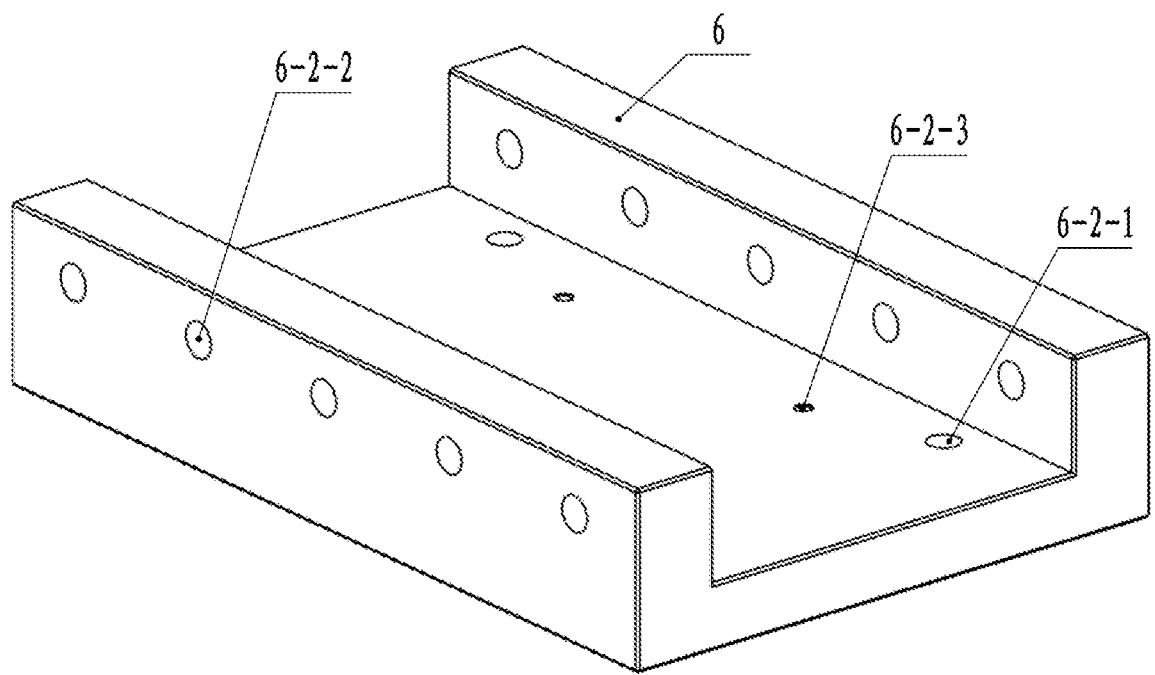
FIG. 20 illustrates the U-foundation.
Figure 21:
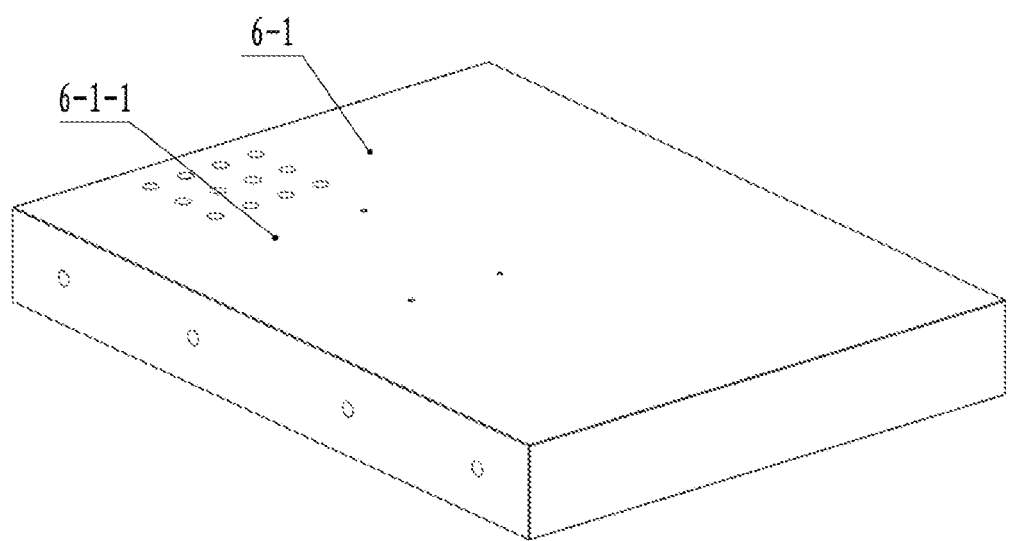
FIG. 21 illustrates the platform.

Wherein: 1 the whetstone component; 1-1 A whetstone A; 1-1-1 the working surface of whetstone; 1-1-2 the fixing hole in the whetstone; 1-2 the whetstone connecter; 1-2-1 the screw holes for the whetstone adjustment; 1-2-2 the counterbore in the whetstone connecter; 1-2-3 ball slot; 1-3 B whetstone B; 2 the baffle component; 2-1 L-board A; 2-1-1 the fixing hole in the L-board A; 2-1-2 the set-screw holes for the plate A; 2-1-3 the screw holes for locating the plate; 2-2 L-board B; 2-2-1 the fixing hole in the L-board B; 2-2-2 the set-screw holes for the plate B; 2-3 L-board C; 2-3-1 the fixing hole in the L-board C; 2-3-2 the screw holes for locating the plate; 2-3-3 vertical rail surface; 2-4 L-board D; 2-4-1 the fixing hole in the L-board D; 2-4-2 vertical rail surface; 2-5 plate A; 2-5-1 vertical rail surface; 2-6 plate B; 2-6-1 vertical rail surface; 3 the multi-ball bearing plate component; 3-1 multi-ball bearing plate A; 3-2 multi-ball bearing plate B; 3-3 multi-ball bearing plate C; 3-4 multi-ball bearing plate D; 4 the whetstone driven component; 4-1 wedge A; 4-1-1 vertical rail surface; 4-1-2 the screw holes for the whetstone connecter; 4-2 wedge B; 4-2-1 horizontal rail surface; 4-2-2 the rail surface for bottom plate; 4-2-3 T-slot; 4-2-4 wedge rail surface; 4-3 adapter for rotary table; 4-3-1 the screw holes for the baffle component; 4-3-2 the fixing counterbore of the adapter for rotary table; 4-4 T-slot snap ring; 4-4-1 the connecting hole for the micrometer; 4-4-2 the set-screw holes for the micrometer; 4-5 the clamp for micrometer; 4-5-1 the fixing hole in the clamp for micrometer; 4-5-2 the fixing hole for the micrometer; 4-6 micrometer; 5 the roller component; 5-1 base-circle plate5-2 multi-ball bearing; 5-3 crosswasher; 5-4 plain washer; 5-5 locking nut; 5-6 gear helix artifact with equal common normal; 6 the foundation component; 6-1 platform; 6-1-1 the screw holes for the U-foundation; 6-1-2 the screw holes of the position baffle for the base-circle plate; 6-2 U-foundation; 6-2-1 the fixing counterbore hole in the U-foundation; 6-2-2 the screw holes for the inside and outside baffle of the rail; 6-2-3 the screw holes of the clamp for rotary table; 7 the position baffle for the base-circle plate; 7-1 the fixing hole in the position baffle for the base-circle plate; 8 the rail component; 8-1 the inside baffle of the rail; 8-1-1 the screw holes for limiting the inside of the rail; 8-1-2 the fixing hole in the inside baffle of the rail; 8-2 the outside baffle of the rail; 8-2-1 the screw holes for limiting the outside of the rail; 8-2-2 the fixing hole in the outside baffle of the rail; 8-3 the rail; 9 the spring clamp with guide pillar; 10 the rotary table component; 10-1 the rotary table; 10-1-1 the screw holes of the adapter for rotary table; 10-2 the clamp for rotary table; 10-2-1 the fixing hole in the clamp for rotary table; 11 the connecting screw; 12 the limiting screw; 13 the setscrew; 14 the PTFE rail belt.

Concrete Implementation Modes

The invention provides a lapping device for gear helix artifact with equal common normal by rolling method, comprise the whetstone component1, the baffle component 2, the multi-ball bearing plate component 3, the whetstone driven component 4, the roller component 5, the foundation component 6, the position baffle for the base-circle plate 7, the rail component 8, the spring clamp with guide pillar 9, the rotary table component 10, the connecting screw 11, the limiting screw 12, the setscrew 13.

The whetstone component comprises the whetstone A1-1, the whetstone B1-3 and the whetstone connecter1-2. the whetstone A1-1 and the whetstone B1-3 are made of silicon carbide (SiC) by sintering. The Mohs hardness of silicon carbide is 9.5, which has high hardness, low thermal expansion coefficient, good performance and dimensional stability, especially suitable for making high-precision lapping stone. The whetstone A1-1 and the whetstone B1-3 are ultra-precisely lapping or processed by lapping, the flatness deviation of the working surface of whetstone1-1-1 is controlled within 1 μm, and the perpendicularity deviation from the bottom surface is controlled within 1 μm. The whetstone A1-1 and the whetstone B1-3 used in the device are connected with bolts and then uniform lapping, so that the flatness deviation of the two lapping surfaces of whetstone1-1-1 and the perpendicularity deviation between the bottom surface are consistent. The whetstone A 1-1 and the whetstone B 1-3 are installed on the whetstone connecter 1-2 with the connecting screw 11, and connect the whetstone component 1 to the wedge A1 by installing the connecting screw 11 in the counterbore in the whetstone connecter 1-2-2. The whetstone A1-1 and the whetstone B1-3 are equipped with the fixing hole in the whetstone1-1-2, and the diameter is slightly larger than the screw holes for the whetstone adjustment 1-2-1, the position of the whetstone A1-1 and the whetstone B1-3 can be slightly adjusted before tightening the connecting screw11, and the distance between Whetstone A1-1 and Whetstone B1-3 lapping surface of whetstone can be precisely controlled with the gauge block.

The baffle component 2 comprises L-board A 2-1, L-board B 2-2, L-board C 2-3, L-board D 2-4, plate A 2-5, plate B 2-6 and the adapter for rotary table 4-3. The L-board C2-3 and L-board D2-4 are provided with ultra-precision lapping vertical rail surfaces 2-5-1 as fixed rails. The plate A2-5 and the plate B2-6 are provided with ultra-precisely lapping vertical rail surfaces 2-6-1 as adjustable rails. The wedge A 4-1 is provided with an ultra-precision lapping vertical rail surface 4-1-1, the wedge B 4-2 is provided with ultra-precision lapping horizontal rail surface 4-2-1, the rail surface for bottom plate4-2-2 and wedge rail surface 4-2-4. The L-board A 2-1 is provided with the screw holes for locating the plate 2-1-3 and the set-screw holes for the plate A2-1-2, the limiting screw 12 is installed in the screw holes for locating the plate 2-1-3 to realize the limit of plate A 2-5 and plate B 2-6, by installing the setscrew 13 in the set-screw holes for the plate A 2-1-2, the plate A 2-5, the multi-ball bearing plate A 3-1, the wedge A 4-1, the wedge B 4-2 and the multi-ball bearing plate C 3-3 are pressed on the vertical rail surface of the L-board C 2-3. The L-board B2-2 is provided with the set-screw holes for the plate B 2-2-2, by installing the setscrew 13 in the set-screw holes for the plate B 2-2-2, the plate B 2-6, the multi-ball bearing plate B 3-2, the wedge A 4-1, and the multi-ball bearing plate D3-4 are pressed on the vertical rail surface of the L-board D 2-4. The L-board C2-3 is provided with the screw holes for locating the plate 2-3-2, the limiting screw 12 is installed in the screw holes for locating the plate 2-3-2 to realize the limit of plate B 2-6. The screw holes for the baffle component 4-3-1 is provided on the adapter for rotary table4-3, L-boardA2-1, L-board B2-2, L-board C2-3, L-board D2-4 are installed on the adapter for rotary table 4-3 with the connecting screw 11.

The whetstone driven component3 comprises the wedge A 4-1, the wedge B 4-2, the adapter for rotary table 4-3, the T-slot snap ring 4-4, the clamp for micrometer 4-5 and the micrometer 4-6. The wedge A4-1 and the wedge B4-2 are first processed as a whole wedge, and after ultra-precision lapping, they are cut into two parts by wire cutting. First lapping the contact surface of the whetstone connecter, and then lapping the contact surface of the adapter for rotary table to ensure that the flatness of both sides is not greater than 1 μm and the parallelism between the two sides is not greater than 2 μm, then the two opposite surfaces in contact with the multi-ball bearing plate are lapped, except ensure that the flatness is not more than 1 μm and the perpendicularity relative to the whetstone connecter contact surface is not more than 1 μm, the parallelism error between the two opposing surfaces is not more than 2 μm, then the other two opposing surfaces in contact with the multi-ball bearing plate are lapped, except ensure that the flatness is not more than 1 μm and the perpendicularity to the contact surface of the whetstone connecter is not more than 1 μm, and the parallelism error between the two opposing surfaces is not more than 2 μm, finally, the wedge part is processed by wire cutting, and the wedge is cut into two wedges about the wedge A4-1 and wedge B4-2 according to the designed angle, the wedge surface produced by cutting is used as the wedge rail surface between the wedge A4-1 and the wedge B4-2. The wedge A4-1 is provided with the screw holes for the whetstone connecter 4-1-2 for installing the whetstone connecter 1-2. The rail surface of the wedge A4-1 is used as a vertical rail surface4-1-1 by ultra-precisely lapping; after ultra-precisely lapping for the rail surface of the wedge B4-2, the four vertical surfaces are used as horizontal rail surfaces 4-2-1, the bottom surface is used as the rail surface for bottom plate 4-2-2 which is attached with a PTFE rail belt 14 and reach the target accuracy by scraping, the wedge surface is used as wedge rail surface4-2-4, which is attached with a PTFE rail belt 14 and reach the target accuracy by scraping. There is a T-slot 4-2-3 on the wedge B, which cooperates with the T-slot snap ring 4-4 to realize the advance and pull-back of the micrometer 4-6. There is a fixing hole for the micrometer 4-5-1 on the clamp for micrometer 4-5 for installing the micrometer 4-6, tighten on the adapter for rotary table 4-3 with the connecting screw 11.

There is a screw holes of the adapter for rotary table 10-1-1 on the rotary table 10-1, and the fixing counterbore of the adapter for rotary table on the adapter for rotary table 4-3 is connected with the connecting screw 11 to realize the rotary table 10-1 is connected with adapter for rotary table 4-3. The clamp for rotary table 10-2 is provided with the fixing hole in the clamp for rotary table 10-2-1, and the fixing hole in the clamp for rotary table 10-2-1 is connected to the screw holes of the clamp for rotary table 6-2-3 with the connecting screw 11 to realize the connection of the rotary table 10-1 and the U-foundation 6-2. The rotary table 10-1 can realize the accuracy of the left-handed and right-handed helix angle indexing of the same design base circle helix angle. The multi-tooth division table can achieve high-precision indexing with the base circle helix angle at a specific angle.

U-foundation 6-2 is provided with the fixing counterbore hole in the U-foundation 6-2-1, the screw holes for the inside and outside baffle of the rail 6-2-2 and the screw holes of the clamp for rotary table 6-2-3. The rail 8-3 is placed on the U-foundation 6-2, and the inside baffle of the rail and the outside baffle of the rail are connected to the screw holes for the inside and outside baffle of the rail 6-2-2 of the U-foundation 6-2 with the connecting screw11. At the same time, install the limiting screw on the screw holes for limiting the inside of the rail 8-1-1 and the screw holes for limiting the outside of the rail 8-2-1 to realize the limit of the rail 8-3.

The roller component 5 is composed of base-circle plate 5-1, multi-ball bearing 5-2, crosswasher 5-3, plain washer 5-4, locking nut 5-5, gear helix artifact with equal common normal5-6. Install the gear helix artifact with equal common normal 5-6 on the base-circle plate 5-1, the two base-circle plates have the same diameter. After they are assembled with the multi-ball bearing 5-2, cross washer 5-3, and plain washer 5-4, the locking nut5-5 are used to lock.

Before machining the involute cylindrical surface of the 0° base circle helix angle of gear helix artifact with equal common normal5-6, the axis of the roller component5 are adjusted to keep strictly parallel to the working surface of whetstone, and the adjustment datum is working surface of the fixing hole in the position baffle for the base-circle plate7. After adjustment, the lower pressing plate of the spring clamp with guide pillar 9 are pressed against the convex table surface of the rotary table, and the steel ball on the upper pressing plate contacts the ball slot 1-2-3 on the whetstone connecter1-2, the clamping of the device is realized under the tension of the tension spring in the spring clamp with guide pillar to prevent the position of whetstone 1-1 from shifting due to the relative movement between the wedge A4-1 and the wedge B4-2. Drive the roller component5 to do pure rolling motion on the rail, and the high-precision lapping process of the involute cylindrical surface of the gear helix artifact with equal common normal 5-6 can be realized.

Before machining the left-handed and right-handed involute helicoidal surface of the same design base circle helix angle of gear helix artifact with equal common normal5-6, the rotary table10-1 for high-precision indexing are adjusted. If the multi-tooth division table are used, indexing can be carried out manually, and the indexing angle is the base circle helix angle of the gear helix artifact with equal common normal. The combination of the baffle component2, the multi-ball bearing plate component3, the whetstone driven component4 and the micrometer4-6 can realize the high-precision linear movement of the wedge A4-1 in the vertical direction to avoid the excessive use of the working surface of whetstone 1-1-1 at the same location of the wedge A1-1 and the wedge B1-3 which leads to loss of flatness and distance accuracy of the wedge A1-1 and the wedge B1-3. The micrometer4-6 cooperates with the T-slot snap ring 4-4 to realize the horizontal movement of the wedge B4-2, after the lifting is completed, the spring clamp with guide pillar 9 is used for clamping. Drive the roller component 5 to do pure rolling motion on the rail, and the high-precision lapping process of the involute cylindrical surface of the gear helix artifact with equal common normal 5-6 can be realized.

Changing the whetstone in this device to a grinding wheel or other flat machining tools for grinding or cutting of gear helix artifacts, or modification and upgrade of partial details, is still within the protection scope of this patent.

The invention claimed is:

1. A lapping device for gear helix artifact with equal common normal by rolling method, comprising a whetstone component, a baffle component, a multi-ball bearing plate component, a whetstone driven component, a roller component, a foundation component, a position baffle for the base-circle plate, a rail component, a spring clamp with a guide pillar, a rotary table component, wherein the rail component is fixed on the foundation component, one side of the rail component and the foundation component is positioned with the position baffle for the base-circle plate, the roller component is located on the rail component; in a groove of the foundation component, between two guide rails, the whetstone component is located above the rotary table component and is clamped with the spring clamp with guide pillar; in the same working plane between the whetstone component and the rotary table component, the whetstone driven component, the multi-ball bearing plate component and the baffle component are arranged from inside to outside;

the multi-ball bearing plate component comprises a multi-ball bearing plate A, a multi-ball bearing plate B, a multi-ball bearing plate C and a multi-ball bearing plate D to form four faces of a rectangular space; the whetstone driven component comprises a wedge A, a wedge B, an adapter fora rotary table, a T-slot snap ring, a clamp for a micrometer, and the micrometer; the wedge A is provided with a connecting screw holes for installing a whetstone connecter; a rail surface of the wedge A and the multi-ball bearing plate D after lapping can be used as vertical rail surfaces, the rail surfaces of the wedge A and the wedge B respectively in contact with the multi-ball bearing plate A and the multi-ball bearing plate C after lapping can be used as horizontal rail surfaces; the bottom surface of the wedge B, as the rail surface for bottom plate, is attached a PTFE rail belt, which can reach a target accuracy by scraping; the wedge rail surface between the wedge A and the wedge B is attached with a PTFE rail belt, which can reach the target accuracy by scraping; there is a T-slot on the wedge B, which cooperates with the T-slot snap ring to realize advance and pull-back of the micrometer; there is a fixing hole for the micrometer on the clamp for the micrometer for installing the micrometer, tighten on the adapter for rotary table with a connecting screw; the micrometer cooperates with the T-slot snap ring to realize a horizontal movement of the wedge B, then push the wedge A to make a linear movement in a vertical direction to change the lapping work area of whetstone.

2. The lapping device for gear helix artifact with equal common normal by rolling method according to claim 1, wherein the whetstone component comprises a whetstone A, a whetstone B and the whetstone connecter, a lapping surface of whetstone is lapping, has the sub-micron level of surface accuracy; the whetstone A (1-1) and the whetstone B are provided with the fixing hole in the whetstone, the whetstone connecter is provided with screw holes for whetstone adjustment, a counterbore and ball slot, the ball slot can provide positioning support for the clamp when using matching related clamps; the whetstone A and the whetstone B are installed on the whetstone connecter with the connecting screw, and the whetstone connecter is pressed against the wedge A through the counterbore on the whetstone connecter, the fixing hole in the whetstone is larger than the screw holes for the whetstone adjustment, so as to realize slight adjustment of positions of the whetstone A and the whetstone B, the whetstone A and the whetstone B are arranged symmetrically, and intersection of the lapping surface and a guide rail plane is parallel, and a distance is a design length of the common normal of three teeth of the gear helix artifact with equal common normal.

3. The lapping device for gear helix artifact with equal common normal by rolling method according to claim 1, wherein the baffle component comprises an L-board A, an L-board B, an L-board C, an L-board D, a plate A, a plate Band an adapter for rotary table;

the L-board A, the L-board B, the L-board C, and the L-board D are fixed on the adapter for rotary table as four sides of the rectangular space to enclose the multi-ball bearing plate component; the L-board C and the L-board D contacting with the multi-ball bearing plate component are used as fixed rails, and a contact surface is a vertical rail surface by lapping;

the plate A and the plate B contacting with the multi-ball bearing plate component, and the plate A and plate B are used as adjustable rails, and the contact surface is a vertical rail surface that has been lapped; the L-board A is provided with the screw holes for locating the plate and setscrew holes for the plate A, a limiting screw is installed in the screw holes for locating the plate to realize a limit of plate A and plate B, with installing a setscrew in the setscrew holes for the plate A, the plate A, the multi-ball bearing plate A, the wedge A, the wedge B and the multi-ball bearing plate C are pressed on the vertical rail surface of the L-board C, the L-board Bis provided with the setscrew holes for the plate B, with installing the setscrews in the setscrew holes for the plate B, the plate B, the multi-ball bearing plate B, the wedge A, and the multi-ball bearing plate Dare pressed on the vertical rail surface of the L-board D; the L-board Cis provided with the screw holes for locating the plate, the limiting screws are installed in the screw holes for locating the plate to realize the limit of plate B.

4. The lapping device for gear helix artifact with equal common normal by rolling method according to claim 1, wherein the rotary table is used to drive the whetstone A and the whetstone B to rotate, adjust an angle between the lapping surface of the whetstone and an axis of a base-circle cylinder, and realize grinding of the artifact of abase circle helix angle at any angle, at the same time, the accuracy of a left-handed and right-handed helix angle indexing of the same design base circle helix angle is achieved.

5. The lapping device for gear helix artifact with equal common normal by rolling method according to claim 1, wherein the whetstone A and the whetstone B are made of silicon carbide, boron carbide or cubic boron nitride by sintering.

* * * * *